Patented Apr. 1, 1930

1,752,462

UNITED STATES PATENT OFFICE

WALTER F. SMITH, OF KINGSPORT, TENNESSEE, ASSIGNOR, BY MESNE ASSIGNMENTS, TO KINGSPORT PRESS, INC., A CORPORATION OF DELAWARE

NONTARNISHING METALLIC INK

No Drawing.   Application filed November 16, 1927. Serial No. 233,746.

The invention relates to an improvement in the composition of metallic pigment printing inks of the class of such inks which are used for stamping titles and designs on book bindings and the like.

It is a practical requirement in using inks of this character that the vehicles which carry the contained metallic pigments should not dry readily at atmospheric temperature; should dry rapidly when applied to the heated type or dies but should not dry so rapidly as to form gummy coatings thereon, and otherwise it is required that such inks have a readily flowing consistency permitting a smooth and clean transference of the same through the inking rollers to the type or die.

One composition which has been used to meet the peculiar requirements of such inks comprises a metallic pigment, a vehicle therefor including a suitable medium which is a solvent for the body of the vehicle and which evaporates without carbonization and has a boiling point relatively high to reduce vaporization at atmospheric temperature.

Numerous examples of such medium have been suggested, such as the derivatives of the terpene series of hydro-carbon compounds and the alcohols, of which terpineol has been most extensively used. Other suitable solvents are benzyl alcohol and certain esters of aromatic acids, such as terpinyl acetate, benzyl acetate, and ethyl benzoate. The solvent has been combined with a thickening agent forming the body of the vehicle, usually a resinous material, such as colophony (ordinary rosin in a benzyl alcohol solution). This resinous body is dissolved in the medium in various proportions to produce a vehicle of the desired consistency. The metallic pigment, preferably a bronze alloy of copper, or other metallic powder of the desired color, is thoroughly incorporated with the vehicle to complete the ink.

While it is claimed for such known forms of metallic pigment inks, such for example as those containing dissolved rosin and terpineol, that the contained pigment is protected from oxidation and consequent discoloration, and that the vehicle forms a lacquer which protects the pigment from tarnishing, this claim is not confirmed in actual practice. While inks of this character possess the desirable attributes of proper drying reactions and are otherwise satisfactory due to low cost and the like, they have the objection that the inked impressions made therefrom soon become discolored, lose their initial brilliancy and eventually turn black.

Accordingly, the primary object of this invention is to provide a simple form of metallic pigment ink of the character outlined, which will have the desirable properties of the rosin-terpineol type of such inks, and which, at the same time, will feature an ink which when dry will retain its original lustre and be substantially free from tarnishing for a long period of time after it has been applied.

Broadly, this object is attained by adding to the known rosin-terpineol, or equivalent types of metallic pigment ink, a substance capable of forming a protecting coating or lacquer on the metallic particles and which, incidentally, will not have any deleterious effect either on the metal, on its vehicles or on its solvents.

One such substance which has given satisfactory results is nitro-cellulose (pyroxylin) or similar material likewise insoluble in terpineol, dissolved in appropriate solvents such as ethyl acetate, butyl acetate, ethyl alcohol, methyl alcohol, benzol, ether and the like.

In preparing the ink the powdered metal is simply stirred slowly into a solution of nitro-cellulose (pyroxylin) until the metallic particles are completely coated. In one practical instance where a bronze powder was used, the nitro-cellulose (pyroxylin) was present in the proportion of about one part of the pyroxylin to two parts of the metal.

The liquid portion of this lacquer is then driven off in such a way as to leave the coated bronze in powdered form with each small particle covered with a coating of nitro-cellulose. This can be done by ejecting the lacquer through an air jet into a small chamber from which the air is constantly being drawn by a fan through a finely woven silk screen. The metal powder so coated is mixed in the rosin-terpineol, or equivalent vehicle.

in the proportion of approximately two parts of the coated powder to one part of the vehicle.

The ink so produced is applied as is usual with the known rosin-terpineol metallic inks, being carried by means of an ink fountain or table to the inking rollers and hence transferred to the heated type or die which reacts to volatilize the solvents present in the liquid composition.

The resulting impression is highly glossed and the presence of the pyroxylin in the vehicle forms a lacquer which protects the pigment from tarnishing, thus providing a permanent and highly satisfactory title or decoration on book bindings and the like, and which protection is not possible with the usual rosin-terpineol types of metallic inks.

Having thus described my invention, I claim:

1. An ink having a metallic pigment coated with nitro-cellulose (pyroxylin) and a vehicle therefor comprising a resinous substance and terpineol as a solvent for the resinous substance.

2. An ink having a metallic pigment coated with nitro-cellulose (pyroxylin) and a vehicle therefor comprising a resinous substance and terpineol mixed with other solvents for the resinous substance.

3. An ink having a metallic pigment coated with nitro-cellulose (pyroxylin) and a vehicle therefor comprising a thickening agent dissolved in a solvent containing terpineol.

4. An ink having a metallic pigment coated with nitro-cellulose (pyroxylin) and a vehicle therefor comprising rosin in a solvent for the rosin containing terpineol.

5. An ink having a metallic pigment coated with nitro-cellulose (pyroxylin) and a vehicle comprising rosin dissolved in terpineol.

6. An ink comprised of rosin, terpineol, a metallic pigment coated with nitro-cellulose (pyroxylin), in which the nitro-cellulose is present in the proportion approximately of one part of nitro-cellulose to two parts of the pigment.

This specification signed this 5th day of November, 1927.

WALTER F. SMITH.